(12) United States Patent
Matiash et al.

(10) Patent No.: US 10,155,278 B2
(45) Date of Patent: Dec. 18, 2018

(54) WIRE FEEDER ASSEMBLY WITH MOTOR MOUNT

(75) Inventors: Nicholas A. Matiash, Oshkosh, WI (US); Thomas D. Lahti, Combined Locks, WI (US)

(73) Assignee: Illinois Tool Works Inc., Glenview, IL (US)

( * ) Notice: Subject to any disclaimer, the term of this patent is extended or adjusted under 35 U.S.C. 154(b) by 422 days.

(21) Appl. No.: 13/601,405

(22) Filed: Aug. 31, 2012

(65) Prior Publication Data

US 2014/0061177 A1 Mar. 6, 2014

(51) Int. Cl.
*B23K 9/28* (2006.01)
*B23K 9/00* (2006.01)
*B23K 9/12* (2006.01)
*B23K 9/133* (2006.01)

(52) U.S. Cl.
CPC .............. *B23K 9/12* (2013.01); *B23K 9/1336* (2013.01)

(58) Field of Classification Search
CPC .......... B23K 9/28; B23K 9/1336; B23K 9/12; B23K 9/124; B23K 9/125; B23K 9/32; B65H 51/10; B65H 57/12
USPC ....... 219/138, 139, 140, 141, 142, 143, 144, 219/137.31, 137.44, 137.51, 137.7, 137.8, 219/137.2, 136, 137.71, 72; 226/190, 226/181; 310/112, 114, 113, 209, 75 D, 310/68 B, 75 R; 74/661; 464/112; 446/85, 88, 90, 91, 93, 103, 105, 106, 446/108, 112
See application file for complete search history.

(56) References Cited

U.S. PATENT DOCUMENTS

| 2,231,910 A * | 2/1941 | Henning et al. ....... H01B 13/18 |
| | | 29/235 |
| 2,272,158 A | 2/1942 | Anderson |
| 2,493,585 A * | 1/1950 | Ketay et al. .................. 318/580 |

(Continued)

FOREIGN PATENT DOCUMENTS

| DE | 29920227 | 1/2000 |
| EP | 1016486 | 7/2000 |

(Continued)

OTHER PUBLICATIONS

Miller Electric Mfg. Co., S-52A, S-54A Owner's Manual, Oct. 1991, 40 pgs., USA.

(Continued)

*Primary Examiner* — Ibrahime A Abraham
*Assistant Examiner* — Gyounghyun Bae
(74) *Attorney, Agent, or Firm* — George R. Corrigan

(57) ABSTRACT

A wire feeder has a motor, mounting plate, intermediate mounting plate, and base assembly. The mounting plate has a plurality of mounting hole patterns and a shaft hole. The motor a mounting hole pattern that aligns with at least one of the plurality. One of a plurality of motor types can be mounted to the mounting plate. The mounting plate is mounted to the intermediate mounting plate, which is mounted to the base assembly. The base assembly includes a drive gear, which is connected to rotate with an insulating cap that receives a gear hub. The gear hub is connected to rotate with the motor shaft via matching keys. The insulating hub, intermediate mounting plate and mounting plate are electrically insulating, so that the base assembly is electrically isolated from the motor.

6 Claims, 3 Drawing Sheets

(56) References Cited

U.S. PATENT DOCUMENTS

| | | | |
|---|---|---|---|
| 2,754,958 A | 7/1956 | Murrell et al. | |
| 2,904,168 A | 9/1959 | Wall et al. | |
| 2,906,913 A | 9/1959 | Catlett | |
| 3,016,451 A | 1/1962 | Cornell, Jr. | |
| 3,026,012 A | 3/1962 | Clay | |
| 3,046,438 A | 7/1962 | Elseth | |
| 3,168,665 A * | 2/1965 | Holper | 310/112 |
| 3,279,669 A | 10/1966 | Bernard et al. | |
| 3,331,545 A | 7/1967 | Olivieri | |
| 3,344,305 A | 9/1967 | Ogden | |
| 3,430,832 A | 3/1969 | Meyer | |
| 3,447,305 A | 6/1969 | Stahlecker et al. | |
| 3,447,730 A | 6/1969 | Jeannette | |
| 3,447,832 A | 6/1969 | Shaw | |
| 3,575,621 A * | 4/1971 | Voland et al. | 310/112 |
| 3,629,547 A | 12/1971 | Kester et al. | |
| 3,675,837 A | 7/1972 | Gerould | |
| 3,847,287 A | 11/1974 | Dinse | |
| 3,901,425 A | 8/1975 | Taylor et al. | |
| 3,966,363 A * | 6/1976 | Rowley et al. | 417/423.11 |
| 4,068,106 A | 1/1978 | Shaputis | |
| 4,143,257 A | 3/1979 | Herrmann | |
| 4,160,151 A | 7/1979 | Tonita | |
| 4,165,829 A | 8/1979 | Koveshnikov et al. | |
| 4,177,912 A | 12/1979 | Samokovliski et al. | |
| 4,206,862 A | 6/1980 | DaCosta | |
| 4,210,796 A | 7/1980 | Moerke | |
| 4,261,499 A | 4/1981 | Samokovliski et al. | |
| 4,261,500 A | 4/1981 | Samokovliski et al. | |
| 4,339,231 A * | 7/1982 | Conery | H02G 3/086 174/560 |
| 4,344,553 A | 8/1982 | Lesher et al. | |
| 4,429,820 A | 2/1984 | Angelov et al. | |
| 4,442,334 A | 4/1984 | Lux et al. | |
| 4,501,981 A * | 2/1985 | Hansen | H02K 37/14 310/209 |
| 4,528,483 A * | 7/1985 | Muller | H02K 16/00 310/112 |
| 4,549,068 A | 10/1985 | Kensrue | |
| 4,600,824 A | 7/1986 | Moerke | |
| 4,650,959 A | 3/1987 | Swensrud et al. | |
| 4,659,904 A * | 4/1987 | Greineder | 219/130.21 |
| 4,695,702 A | 9/1987 | Gartland | |
| 4,845,336 A | 7/1989 | Samokovliiski et al. | |
| 4,864,099 A | 9/1989 | Cusick, III et al. | |
| 4,866,321 A * | 9/1989 | Blanchard et al. | 310/112 |
| 5,043,617 A * | 8/1991 | Rostron | F04C 29/005 310/112 |
| 5,293,125 A * | 3/1994 | Griffen | G01P 1/026 310/68 B |
| 5,338,917 A | 8/1994 | Stuart et al. | |
| 5,452,381 A | 9/1995 | Guerra | |
| 5,646,466 A * | 7/1997 | Noji | H02K 3/47 310/112 |
| 5,697,834 A * | 12/1997 | Heumann | B24B 49/12 451/347 |
| 5,738,264 A | 4/1998 | Jackson et al. | |
| 5,763,970 A * | 6/1998 | Dunning | G01P 1/026 310/68 B |
| 5,816,466 A * | 10/1998 | Seufer | B23K 9/1333 226/187 |
| 5,821,718 A * | 10/1998 | Shaffer | G05G 1/54 180/6.5 |
| 5,932,942 A * | 8/1999 | Patyk | H02K 11/33 310/58 |
| 5,990,590 A * | 11/1999 | Roesel, Jr. | F02N 11/04 310/112 |
| 6,066,833 A | 5/2000 | Rigdon et al. | |
| 6,081,056 A * | 6/2000 | Takagi | H02K 5/08 310/216.137 |
| 6,121,700 A * | 9/2000 | Yamaguchi | H02K 5/1675 310/425 |
| 6,257,517 B1 | 7/2001 | Babish et al. | |
| 6,315,523 B1 * | 11/2001 | Mills | 417/45 |
| 6,318,614 B1 | 11/2001 | Boyd | |
| 6,365,867 B1 | 4/2002 | Hooper | |
| 6,388,234 B1 | 5/2002 | Collins et al. | |
| 6,427,894 B1 | 8/2002 | Blank et al. | |
| 6,479,795 B1 * | 11/2002 | Albrecht | 219/137.2 |
| 6,504,276 B2 * | 1/2003 | Yamamura | 310/75 D |
| 6,525,297 B2 | 2/2003 | Doherty | |
| 6,536,644 B2 | 3/2003 | Plow | |
| 6,557,742 B1 | 5/2003 | Bobeczko et al. | |
| 6,568,578 B1 | 5/2003 | Kensrue | |
| 6,722,416 B2 * | 4/2004 | Varley | E06B 9/13 160/264 |
| 6,889,578 B2 * | 5/2005 | Spaziani | E05F 15/697 318/15 |
| 6,903,305 B2 | 6/2005 | Mukai et al. | |
| 7,006,356 B2 * | 2/2006 | Bergmann | H02M 7/003 318/727 |
| 7,026,574 B2 | 4/2006 | Belfiore et al. | |
| 7,191,998 B1 * | 3/2007 | Chalberg | F04D 29/605 248/225.21 |
| 7,374,074 B2 | 5/2008 | Matiash | |
| 7,390,989 B2 | 6/2008 | Matiash et al. | |
| 7,429,716 B2 * | 9/2008 | Bong et al. | 219/125.1 |
| 7,615,723 B2 | 11/2009 | Matiash | |
| 7,802,494 B2 * | 9/2010 | Batistic | 74/665 B |
| 8,232,700 B2 * | 7/2012 | Dooley | H02K 16/02 310/113 |
| 8,700,239 B2 * | 4/2014 | Perry | B60K 6/48 180/165 |
| 9,316,343 B2 * | 4/2016 | O'Hara | F16M 3/00 |
| 2001/0045420 A1 * | 11/2001 | Bong et al. | 219/125.1 |
| 2002/0047415 A1 * | 4/2002 | Aoshima | 310/112 |
| 2003/0178911 A1 * | 9/2003 | Aoshima | 310/266 |
| 2005/0006425 A1 | 1/2005 | Enyedy | |
| 2005/0186889 A1 * | 8/2005 | McNeil et al. | 451/36 |
| 2005/0224486 A1 * | 10/2005 | Matiash | 219/137.7 |
| 2005/0224489 A1 | 10/2005 | Matiash | |
| 2011/0014844 A1 * | 1/2011 | Henson et al. | 446/85 |
| 2011/0100969 A1 * | 5/2011 | Enyedy | 219/136 |
| 2012/0152926 A1 * | 6/2012 | Matiash et al. | 219/137.7 |
| 2012/0161590 A1 * | 6/2012 | Yamasaki | H02K 5/225 310/68 B |

FOREIGN PATENT DOCUMENTS

| | | |
|---|---|---|
| FR | 2548096 | 7/1983 |
| GB | 2183431 | 6/1987 |
| WO | 01/66297 | 9/2001 |

OTHER PUBLICATIONS

Miller Electric Mfg. Co., 22A, 24A Owner's Manual, Oct. 2003, 28 pgs., USA.

Miller Electric Mfg. Co., S-74DX Owner's Manual, Nov. 2003, 40 pgs., USA.

International Search Report, PCT/US2013/057162, dated Jan. 3, 2014, European Patent Office, Rijswijk, Netherlands.

* cited by examiner

WIRE FEEDER ASSEMBLY WITH MOTOR MOUNT

FIELD OF THE INVENTION

The present invention relates generally to the art of wire feeders used for welding. More specifically, it relates to a modular wire feeder used for welding.

BACKGROUND OF THE INVENTION

Some welding processes consume wire as they are carried out. Wire feeders provide wire to a welding gun, which feeds the wire to the arc. Power can be applied to the wire at the feeder, or at the gun. Wire feeders typically have a replaceable spool of wire from which the wire being fed to the arc is unwound. One or more drive rolls grip the wire and pull the wire from the spool, pushing it through a conduit to the gun and the arc. Some wire feeders feed the wire at a constant feed rate, but other wire feeders can vary the feed rate in response to the arc length and voltage.

Wire feeders can be made with different motors, and each motor type can have a unique hole mounting pattern. This makes manufacturing wire feeders more costly and complex, because the base assembly on which the motor is to be mounted must be different for each type of motor. Thus, a wire feeder that is modular, i.e, a wire feeder with a base assembly to which any of a group of different motors can be mounted, is desirable.

Wire feeders that have power applied to the wire at the feeder need to have electrical insulation or isolation between the wire drive and the electric motor. This complicates the attachment of the motor to the base, because screws and other parts are typically metal, and thus conductive. A wire feeder that provides electrical isolation or insulation between the motor and the drive assembly, yet is not complicated, is desired.

SUMMARY OF THE PRESENT INVENTION

According to a first aspect of the invention a wire feeder comprises a motor, a mounting plate, and a base assembly. The mounting plate includes a plurality of motor mounting hole patterns and a motor shaft hole. The motor has one of the plurality of motor mounting hole patterns, and the one motor mounting hole pattern aligns with at least one of the plurality of motor mounting hole patterns. Thus, one of a plurality of motor types can be mounted to the mounting plate. The mounting plate is mounted to the base assembly.

One alternative provides an intermediate mounting plate. The intermediate mounting plate is mounted to the base assembly and the mounting plate is mounted to the base assembly by being mounted on the intermediate plate.

The intermediate mounting plate and/or the mounting plate is mounted to the base assembly using a plurality of screws, and/or the motor is mounted to the mounting plate using a second plurality of screws, in various embodiments.

Another alternative provides that the base assembly includes a drive gear which is connected to rotate with a gear hub, and the gear hub is connected to rotate with the motor shaft.

The gear hub includes a hollowed interior that receives the motor shaft, and the hollowed interior and the motor shaft have matching keys in another embodiment.

The motor is one of a plurality of different sized motors, and each motor has the same size shaft and matching key, and the hollowed interior can receive any of the plurality of motor shafts in another embodiment.

An insulating cap has a non-cylindrical hollow interior in which the gear hub, which also has a non-cylindrical outer surface, is at least partially disposed, such that the gear hub rotates with insulating cap, and the gear hub is attached to rotate with the drive gear, in another embodiment.

The drive gear and insulating cap have a plurality of matching holes in a and screws extends through the matching holes to affix the insulating cap to the drive gear, in another embodiment.

The insulating hub, the intermediate mounting plate and the mounting plate are comprised of an electrical insulating material so that the base assembly can be at a first potential and the motor can be at a second potential without current flowing therebetween, in another embodiment.

Other principal features and advantages of the invention will become apparent to those skilled in the art upon review of the following drawings, the detailed description and the appended claims.

Figure 1:
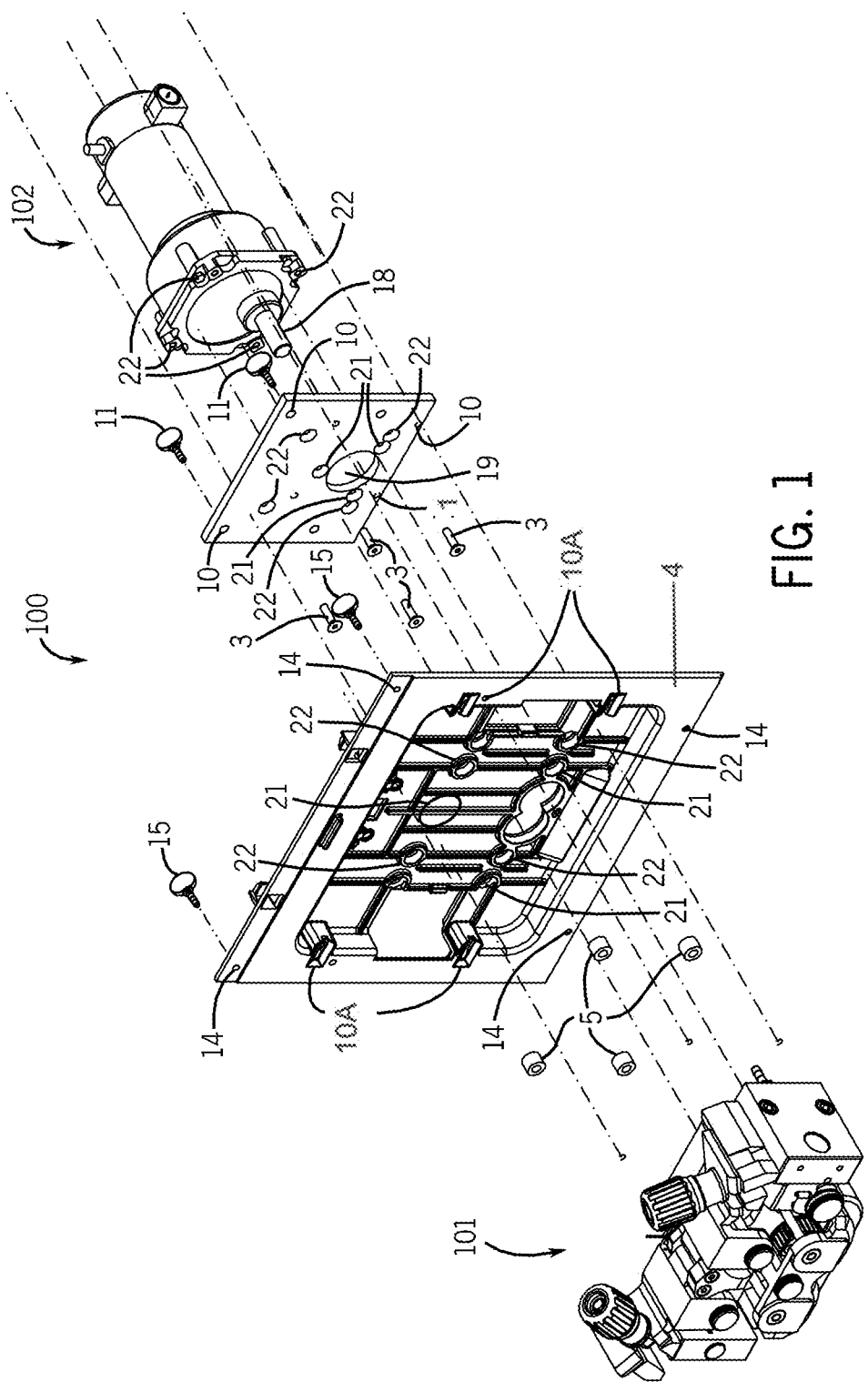
FIG. 1 is an exploded view of the assembly of a wire feeder in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular wire feeder assembly and a particular components, it should be understood at the outset that the invention could be used with other wire feeders and with other components.

A wire feeder, in accordance with the preferred embodiment, includes a motor and drive roll assembly that is modular in that it can receive any of a number of different motor types. It includes a mounting plate that has a number of different hole patterns used to mount motors. Also, it preferably includes an intermediate plate, to which the mounting plate is mounted. The combination of plates, which are made of electrical or insulating material, provide electrical isolation between the motor and the drive roll assembly. Moreover, the preferred embodiment provides a connection from the drive gear to the motor shaft that is also electrically insulating or isolating. Thus, the drive roll assembly can be at one potential (i.e, electrical potential), and the motor mounting at another, without current flowing therebetween.

Referring now to FIG. 1, an expanded perspective view, of a wire feeder 100 is shown. Wire feeder 100 includes a base assembly 101, a motor 102, a mounting plate 1, and an intermediate mounting plate 4. Base assembly, of a wire feeder, as used herein, includes the framework to which the inlet guide, outlet guide, motor, wire tensioners, etc. are mounted. Mounting plate, as used herein, is a plate to which another component is mounted, such as by screws, glue, rivets, etc. Intermediate mounting plate, as used herein, is a mounting plate to which another mounting plate is mounted, such as by screws, glue, rivets, etc.

Motor 102 is mounted to mounting plate 1. Mounting plate 1 is mounted to intermediate mounting plate 4. Intermediate mounting plate 4 is mounted to base assembly 101. Mounting plate 1 and intermediate mounting plate 4 are made of hard plastic or other electrically insulating material. No metal screws extend from motor 102 to base assembly 101. Thus, there is no electrical pathway created from motor 102 to assembly 101 by the mounting of motor 102. Also plates 1 and 4 can provide thermal isolation.

Moreover, plate 1 includes a plurality of motor mounting hole patterns, each pattern being chosen for one particular motor type. For example, holes 21 are used for a three hole mount having a particular spacing. Holes 22 are used for a four hole mount, such as that of motor 102. Thus, a number of different motor types can be mounted to late 1. Motor mounting hole pattern, as used herein, is a hole pattern for screws to mount a motor, i.e, the pattern of the mounting holes on the motor. As may be seen from the hole position of FIG. 1, using holes 22 results in two of holes 21 being covered, and using holes 21 results in one of holes 21 being covered. Because using one group of holes covers some of the holes in the other group, only one motor is mounted at any given time.

Screws 3 are inserted through holes 22 in plate 1, and into motor 102. Thus, motor 102 is mounted to mounting plate one using a particular 1 of the plurality of hole patterns on plate 1. Plate 1 is mounted to assembly 101 using screws 11, which extend through holes 10 and 10A and into assembly 101. Bushings 5 prevent plate 4 from being compressed when screws 11 are tightened. Bushings 5 can be cast or sleeves. Screw, as used herein, includes any threaded fastener, tapered or cylindrical. Alternatively, plate 1 is mounted to intermediate plate 4 using screws 11 and holes 10 and 10A and intermediate plate 4 is mounted to base assembly 101 using screws 15 and holes 14.

Wire feeder 100 may be assembled using a different motor with a different mounting hole pattern simply by using the matching pattern on plate 1. Shaft 18 of motor 102 is inserted through motor shaft hole 19 of plate 1. Alternatives provide for rotating plate 1 to align other hole patterns with other motors, using more or fewer screws, using and using other fasteners. Thus, one hole combination/rotation us used for one motor, and a different hole combination/rotation us used for a second motor. Because plate 1 is rotated only one motor is mounted at any given time. Parts count and complexity is reduced, while providing electrical isolation between motor 102 and base assembly 101.

Figure 2:
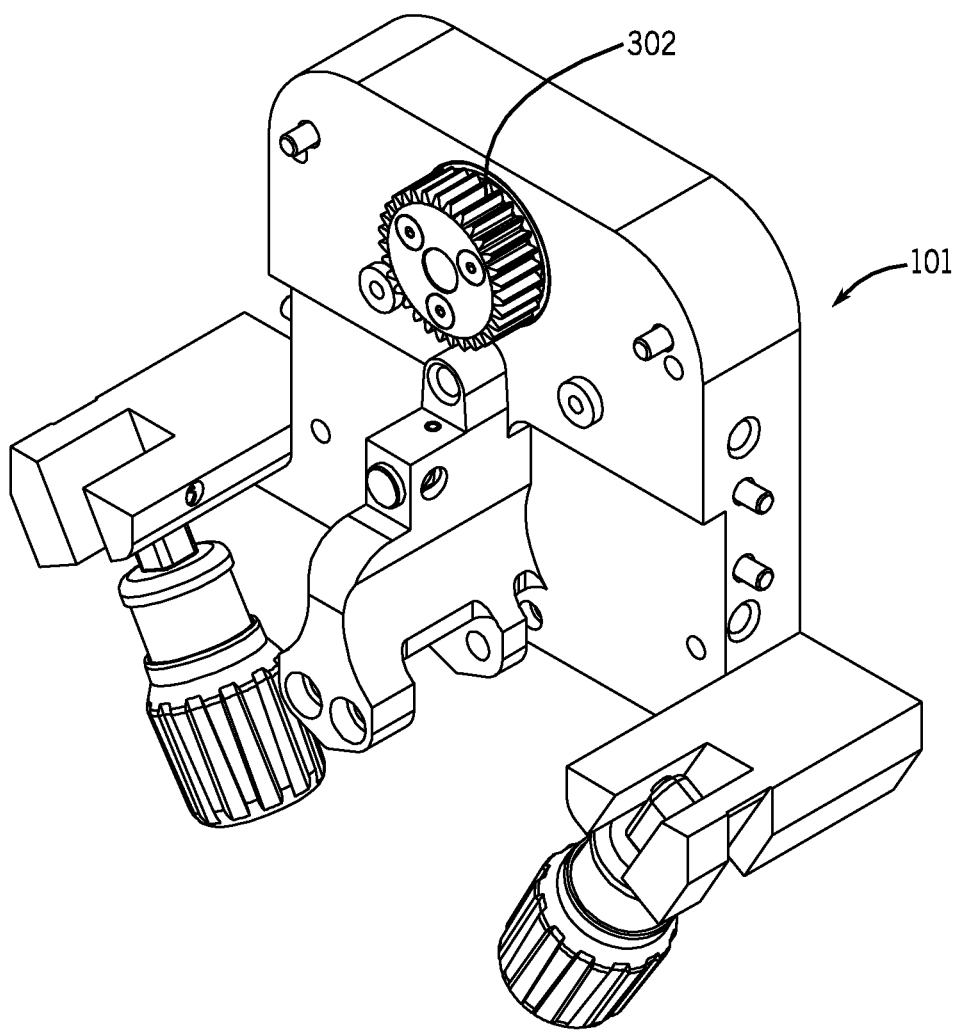
FIG. 2 is a motor and drive roll assembly in accordance with the preferred embodiment.
Figure 3:
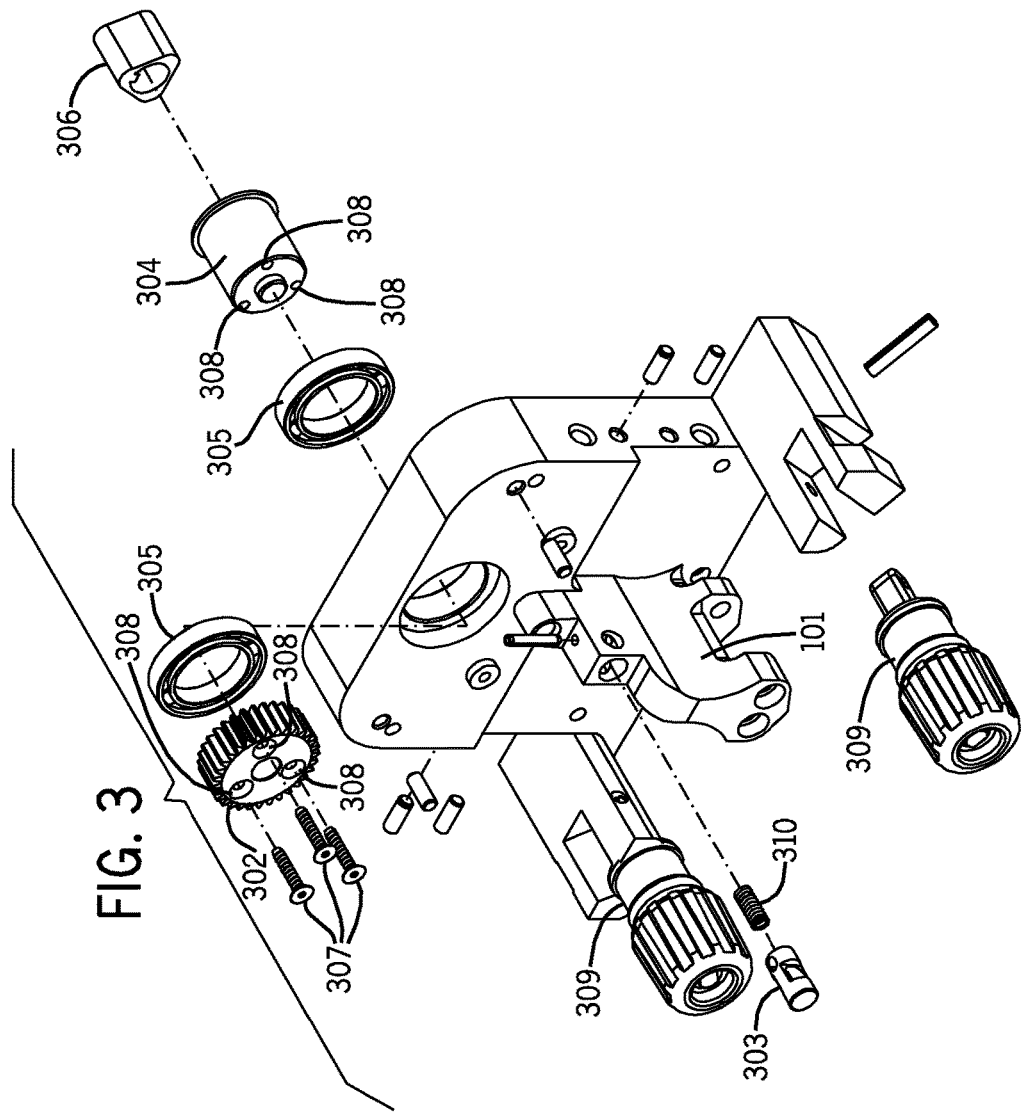
FIG. 3 is an exploded view of a motor and drive roll assembly in accordance with the preferred embodiment.

Turning now to FIGS. 2 and 3, it is shown that shaft 18 of motor 102 is connected to rotate a gear 302 while maintaining electrical isolation. Gear 302 is mounted to an insulating cap 304 by screws 307, which extend through holes 308 in gear 302 and cap 304. Cap 304 is comprised of plastic or other electrically insulating material. In one embodiment screws 307 are also isolating. Cap 304 is rotatably mounted in bearings 305, which are in base assembly 101. Thus, as cap 304 rotates, gear 302 will rotate. Alternative embodiments provide for other ways to transfer the rotation of cap 304 to gear 302, such as by a key or other matching structures.

Cap 304 has a hollow interior that is shaped to match the outer contour of a gear hub 306. Gear hub 306 is disposed at least partially in cap 304, and because their shapes are not cylindrical, as gear hub 306 rotates cap 304 rotates, and gear 302 rotates. Alternative embodiments provide for using different shaped gear hubs, or for screwing the hub to cap 304 or directly to gear 302. Preferably, electrical isolation is maintained by using non-conductive materials.

The interior of gear hub 306 is hollow and shaped to receive motor shaft 18. Preferably motor shaft 18 is keyed, and the inside of gear hub 306 is shaped with a matching key. Matching keys, as used herein, are the two parts of a key such as on a shaft and a hub receiving the shaft. Preferably, gear hub 306 receives a common shaft and key, such as a ½ inch shaft with a ⅛ inch key. Thus, any motor with this common key and shaft, and having one of the plurality of hole patterns on plate 1, can be easily used with wire feeder 100. One alternative provides that there be a number of different gear hubs 306 available, to receive different motor keys. Another alternative provides for more than one plate 1 to choose from, each with a plurality of mounting hole patterns thereon. This will further increase the modularity of wire feeder 100.

A pair of wire tensioners 309, a button spring 310 and a lock 303 can operate consistent with the prior art.

Numerous modifications may be made to the present invention which still fall within the intended scope hereof. Thus, it should be apparent that there has been provided in accordance with the present invention a wire feeder assembly that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A wire feeder, comprising:
   a base assembly, wherein the base assembly includes a drive gear connected to rotate with a gear hub, wherein a wire inlet guide and a wire outlet guide are mounted to the base assembly to form the wire feeder;
   a mounting plate mounted to the base assembly, wherein the mounting plate includes a plurality of motor mounting hole patterns, each of the plurality of motor mounting hole patterns being unique and comprising at least three holes and each of the plurality of motor mounting hole patterns being chosen for a unique motor type and a motor shaft hole, such that the mounting plate is capable of having, at any given time, only one of three different motors mounted thereon;
   an intermediate mounting plate having the plurality of motor mounting hole patterns, wherein the intermediate mounting plate is mounted to the base assembly and the mounting plate is mounted to the base assembly by being mounted on the intermediate mounting plate;
   a motor having a housing with a one of the plurality of motor mounting hole patterns, wherein the one motor mounting hole pattern aligns with a first of the plurality of motor mounting hole patterns, wherein the motor is mounted to the mounting plate and a motor shaft extends through the motor shaft hole, wherein the gear hub is connected to rotate with the motor shaft; and
   an insulating cap having a hollow interior;

wherein the gear hub is attached to rotate with the drive gear, and wherein the gear hub includes a hollowed interior that receives the motor shaft, and wherein the gear hub is disposed at least partially within the hollow interior of the insulating cap such that the gear hub rotates with the insulating cap; and wherein the insulating cap, the intermediate mounting plate and the mounting plate are comprised of at least one electrically insulating material, and wherein there are no metal screws extending through the intermediate mounting plate, wherein the base assembly can be at a first potential and the motor can be at a second potential without current flowing therebetween.

2. The wire feeder of claim 1 wherein the intermediate mounting plate is mounted to the base assembly and the mounting plate is mounted on the intermediate mounting plate using a plurality of screws, and the motor is mounted to the mounting plate using a second plurality of screws.

3. The wire feeder of claim 1 wherein the hollowed interior of the gear hub and the motor shaft have matching keys.

4. The wire feeder of claim 3 wherein the motor is one of a plurality of different sized motors with each motor having the motor shaft of a same size and matching key, and wherein the hollowed interior can receive any of the plurality of motor shafts of the plurality of different sized motors.

5. The wire feeder of claim 3 wherein the gear hub has a non-cylindrical outer surface.

6. The wire feeder of claim 3, wherein the drive gear has a first plurality of holes in a first pattern of holes and the insulating cap has a second plurality of holes in a first end and in the first pattern of holes, further comprising a plurality of screws each one of which extends through one of the first plurality of holes and one of the second plurality of holes, whereby the drive gear is affixed to the insulating cap.

* * * * *